No. 749,530. PATENTED JAN. 12, 1904.
O. L. COMPTON.
GATE.
APPLICATION FILED APR. 16, 1903.
NO MODEL.
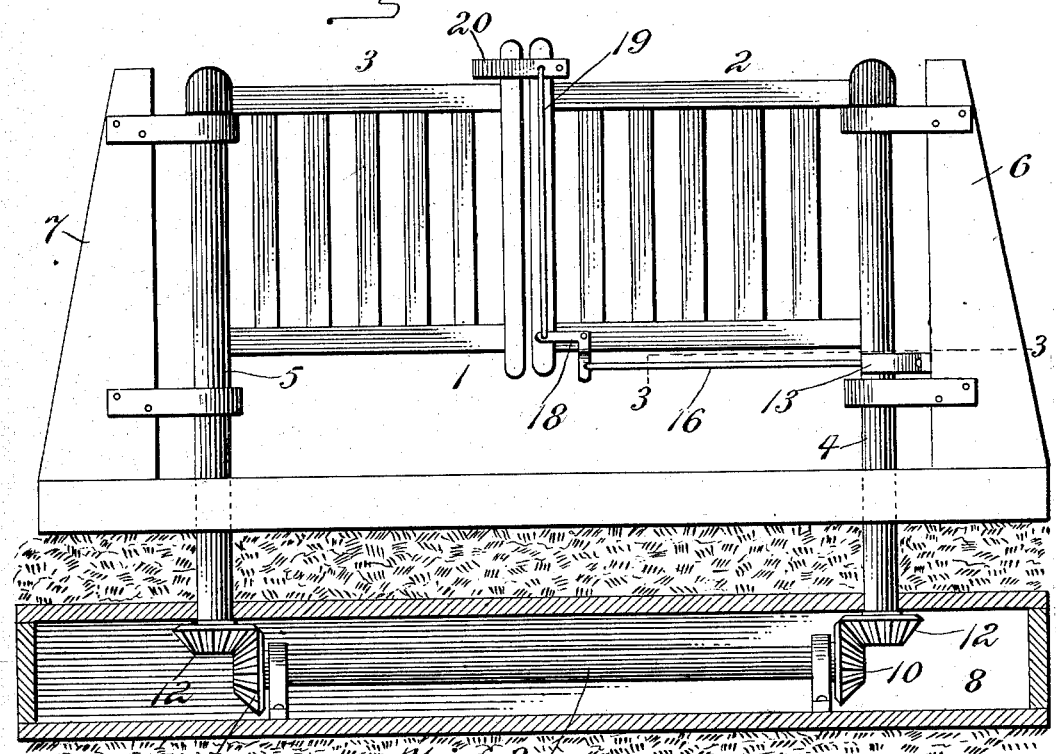
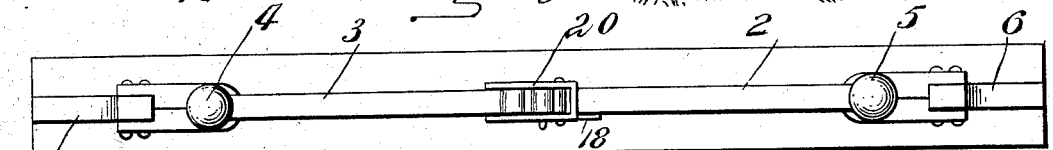
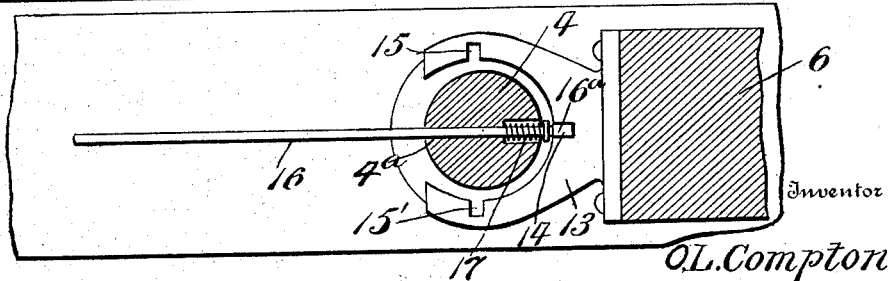
Witnesses
G. W. Worthington
J. R. Willson
Inventor
O. L. Compton
By H. R. Willson
Attorney No. 749,530. Patented January 12, 1904.

UNITED STATES PATENT OFFICE.

OTTO L. COMPTON, OF UNION, OREGON.

GATE.

SPECIFICATION forming part of Letters Patent No. 749,530, dated January 12, 1904.

Application filed April 16, 1903. Serial No. 152,869. (No model.)

*To all whom it may concern:*

Be it known that I, OTTO L. COMPTON, a citizen of the United States, residing at Union, in the county of Union and State of Oregon, have invented certain new and useful Improvements in Gates; and I do declare the following to be a full, clear, and exact description of the invention, such as will enable others skilled in the art to which it appertains to make and use the same.

This invention relates to improvements in gates.

The object of the invention is to provide means whereby the opening of one member of a double gate will simultaneously open the other member.

Another object is to provide means for locking said gate members in closed or open positions.

A further object is to provide means for the accomplishment of these purposes which will be simple, strong, and durable, efficient, and not liable to get out of order.

With these and other objects in view the invention consists of certain novel features of construction, combination, and arrangement of parts, as will be more fully described, and particularly pointed out in the appended claims.

In the drawings, Figure 1 is a side elevation of a double gate, showing the application of the device. Fig. 2 is a top plan view of the same. Fig. 3 is a horizontal sectional view on line 3 3 of Fig. 1.

In the drawings, 1 denotes the gate, which consists of the two swinging members 2 3. Said members are respectively provided with vertically-disposed supporting-bars 4 and 5, which are suitably hinged to gate-posts 6 and 7 to permit the gate members to swing in either direction.

Beneath the surface of the ground immediately below the gate is arranged a box or casing 8, in which is mounted in suitable bearings a horizontally-disposed shaft 9, having fixed to the ends thereof bevel-gears 10, the teeth of which are oppositely disposed, as shown. The lower ends of the bars 4 5 extend downwardly into the box or casing and are provided with beveled gears 12, which mesh with the beveled gears 10 on shaft 9. It will readily be seen from this construction that when either one or the other of the gate members is swung in either direction the opposite member will also be swung in the same direction.

13 denotes a horizontally-disposed plate or bracket in which is formed a segmental or arc-shaped opening in the walls of which are formed a series of radially-disposed notches, preferably three in number, one of which, 14, is arranged in longitudinal alinement with the pivotal point of one of the gate-sections and the other two notches, 15 and 15', are arranged diametrically opposite to each other and to the center of the said pivotal point of the gate-section and in a line at right angles to the line of the first-mentioned notch.

The plate or bracket 13 is adapted to be secured to one or the other of the gate-posts 6 7, and its segmental portion is adapted to embrace the end of the supporting-post of the contiguous gate member. In practice the plate 13 is preferably fixed to the right-hand gate-post or post 6 of the drawings and embraces the bar 4 of gate member 2.

16 denotes a horizontal longitudinally-disposed rod or bar, preferably arranged beneath the bottom rail of the gate member 2 and passing through a longitudinally-disposed hole $4^a$ in the supporting-bar 4 of said gate member. The outer end of the rod 16 is formed with a finger $16^a$, which normally engages one of the notches in the plate 13 and is held in such engagement by a spring 17, which is here shown as a coil-spring disposed on said rod 16, bearing against a collar on said rod and also bearing on the shoulder formed by an enlargement of one end of the hole $4^a$ in the post 4. The said enlarged portion of the said hole $4^a$ serves to receive and house the said spring. To the opposite end of the rod 16 is pivotally connected one arm of a bell-crank lever 18, mounted upon the gate member 2, to the opposite arm of which is connected the lower end of a vertically-disposed link-rod 19, the upper end of which is pivotally connected to a swinging bail or latch 20, which has a pivotal engagement with the upper end of the forward gate-bar in juxtaposition to the upper end of the adjacent gate member 3. The free open ends of the said bail or latch are adapted to engage the upper portion of the member 3 when the gates are closed and the latch down, thereby holding both members of the gate locked together against movement in either direction until the latch is raised, which operation actuates the rods 16 and 19 and lever 18 to withdraw the finger 16ª from the notch 14 and permits the gate members to be swung open.

When the gate members have been swung open to positions at right angles to their former or closed position, the latch or bail may be pushed down, which will cause the finger 16ª to engage one or the other of the notches 15 or 15' and hold the members in such open position.

The advantages of a gate constructed as herein described will be readily apparent. In large double gates wherein the operator is compelled to open one member, then come back and open the other member, and to find a prop or other means for holding each member open while a team is being driven through, a vexatious loss of time and labor is occasioned, which is obviated by the use of my invention.

From the foregoing description, taken in connection with the accompanying drawings, the construction and operation of the invention will be readily understood without requiring a more extended explanation.

Various changes in form, proportion, and the minor details of construction may be resorted to without departing from the principle or sacrificing any of the advantages of this invention.

Having thus fully described my invention, what I claim, and desire to secure by Letters Patent, is—

1. The combination with two gate-posts, of two swinging gate members having vertically-disposed supporting-bars hinged to said gate-posts, means carried by said supporting-bars whereby the said gate members may be connected together in such manner that the swinging of one simultaneously swings the other, a segmental bracket fixed to one of said gate-posts, and having radially-disposed notches, a spring-actuated rod carried by one of said gate members one end of which is adapted to engage said notches to hold said gate members in a closed or open position, and means for operating said spring-actuated rod substantially as and for the purpose described.

2. The combination with two gate-posts, of two swinging gate members having vertically-disposed supporting-bars hinged to said gate-posts, means carried by said supporting-bars whereby the said gate members may be connected together in such manner that the swinging of one simultaneously swings the other, a segmental bracket fixed to one of said gate-posts, and having radially-disposed notches, a spring-actuated rod carried by one of said gate members one end of which is adapted to engage said notches, a bell-crank lever pivoted to said gate members, one arm of which is pivotally connected to the opposite end of said rod, a vertically-disposed link having one end connected to the opposite arm of said bell-crank lever, a latch-bail having a pivotal connection with said gate member and with said link, and adapted to engage the upper portion of the opposite gate member substantially as and for the purpose described.

In testimony whereof I have hereunto set my hand in presence of two subscribing witnesses.

OTTO L. COMPTON.

Witnesses:
C. E. COCHRAN,
J. E. HALL.